United States Patent [19]

Schwing

[11] E Patent Number: Re. 32,657

[45] Reissued Date of Patent: Apr. 26, 1988

[54] TWO-CYLINDER PUMP FOR HEAVY FLOWABLE MATERIALS, SUCH AS CONCRETE

[75] Inventor: Friedrich Schwing, Herne, Fed. Rep. of Germany

[73] Assignee: Friedrich Wilh. Schwing GmbH, Herne, Fed. Rep. of Germany

[21] Appl. No.: 896,679

[22] Filed: Aug. 14, 1986

Related U.S. Patent Documents

Reissue of:

[64] Patent No.: 4,465,441
Issued: Aug. 14, 1984
Appl. No.: 341,298
Filed: Jan. 21, 1982

[30] Foreign Application Priority Data

Jan. 31, 1981 [DE] Fed. Rep. of Germany ..... 3103321

[51] Int. Cl.[4] ..... F04B 7/00; F04B 15/02

[52] U.S. Cl. ..... 417/517; 417/519; 417/900

[58] Field of Search ..... 417/516, 517, 518, 519, 417/532, 900

[56] References Cited

U.S. PATENT DOCUMENTS 4,178,142 12/1979 Schwing ..... 417/900
4,382,752 5/1983 Schlect ..... 417/900

FOREIGN PATENT DOCUMENTS 52192 5/1982 European Pat. Off. ..... 417/900
2362670 6/1975 Fed. Rep. of Germany .
2614895 10/1977 Fed. Rep. of Germany .
2829181 7/1978 Fed. Rep. of Germany .
2835590 4/1979 Fed. Rep. of Germany .
2851354 6/1980 Fed. Rep. of Germany .
2903749 8/1980 Fed. Rep. of Germany .
2921735 12/1980 Fed. Rep. of Germany .

*Primary Examiner*—Carlton R. Croyle
*Assistant Examiner*—Timothy S. Thorpe
*Attorney, Agent, or Firm*—Kinney & Lange

[57] ABSTRACT

A two-cylinder pump for heavy flowable materials, such as concrete, comprising a shutter mechanism which is pivotable across an apertured face plate, the shutter mechanism being sealed against the face plate by means of a cutting ring which is axially movable relatively to the shutter mechanism and is supported thereon with its rear side engaging a rectangular-section flexible rubber ring, whereby the cutting ring is urged resiliently against the face plate, means for locating the cutting ring, along a portion of its length, on the shutter mechanism, a seating for the flexible ring on the cutting ring which includes an annular extension which partly overlaps the longer cross-sectional side of the flexible ring in the axial direction, a seating for the flexible ring on the shutter mechanism which includes an annular extension which partly overlaps the longer cross-sectional side of the flexible ring in the axial direction, said annular extensions partly overlapping the ring from opposite sides thereof so that a part of the surface of the ring is left free between the annular extensions, and stops on the cutting ring and the shutter mechanism which limit the extent to which the cutting ring is inserted in said means for locating the cutting ring on the shutter mechanism.

32 Claims, 5 Drawing Sheets

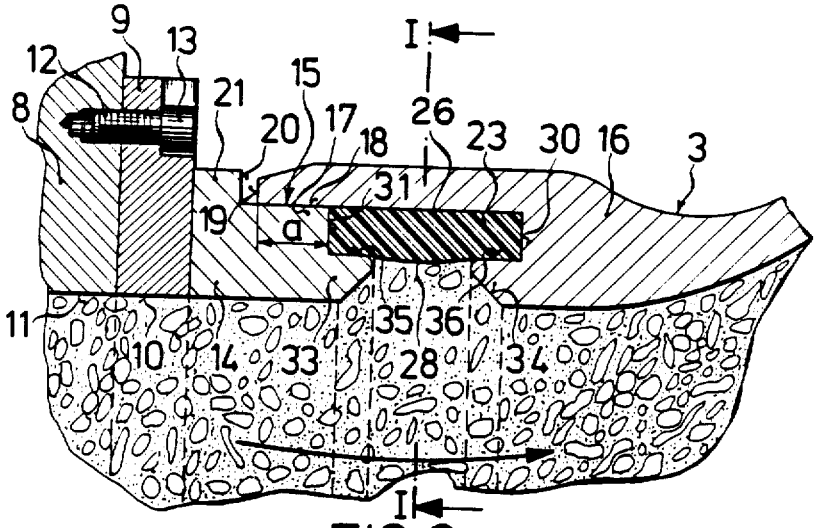
FIG. 2
FIG. 1
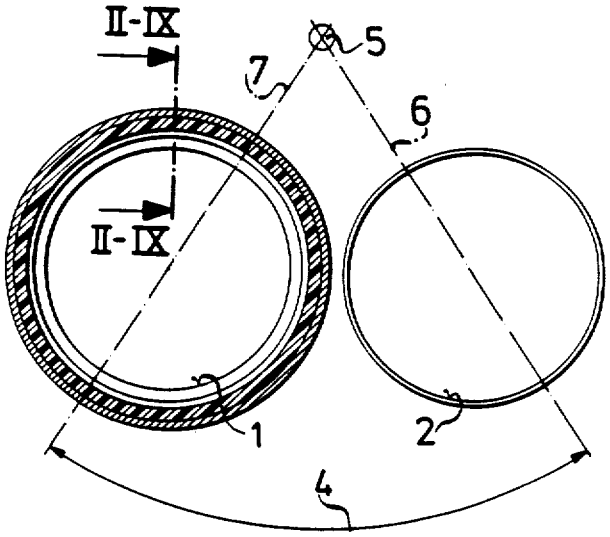

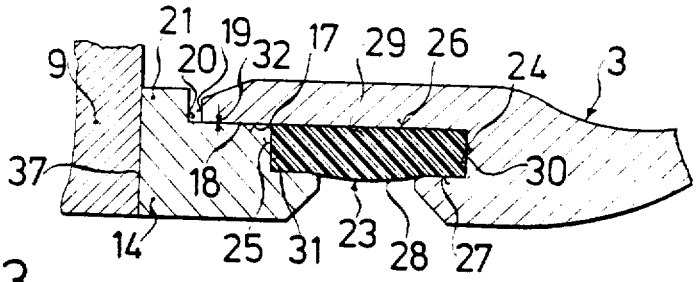
FIG.3
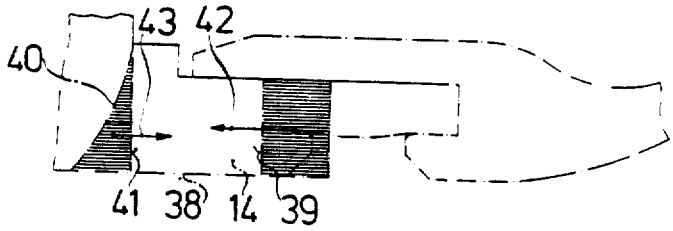
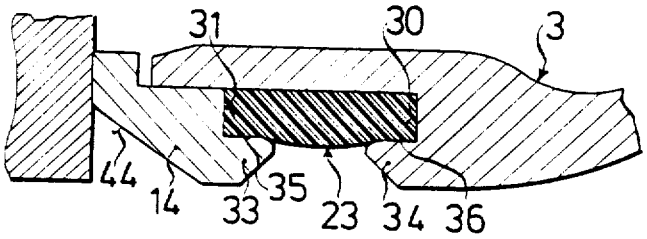
FIG.4
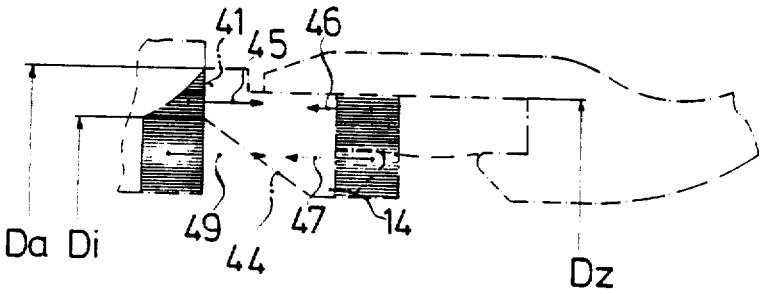

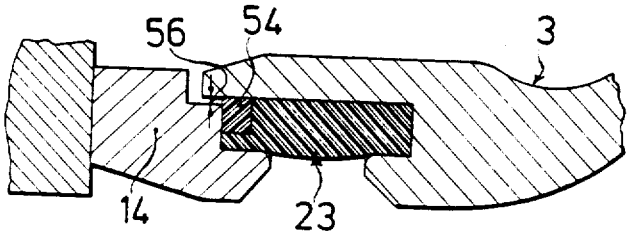
FIG. 5
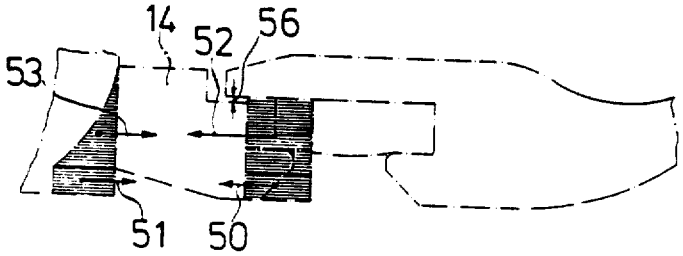

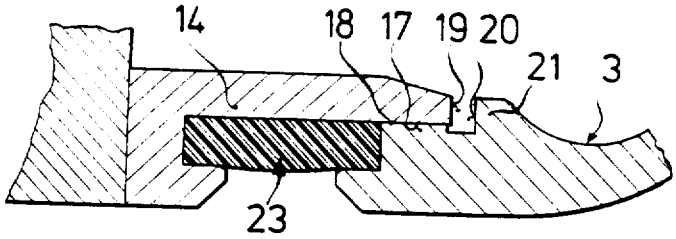
FIG. 6
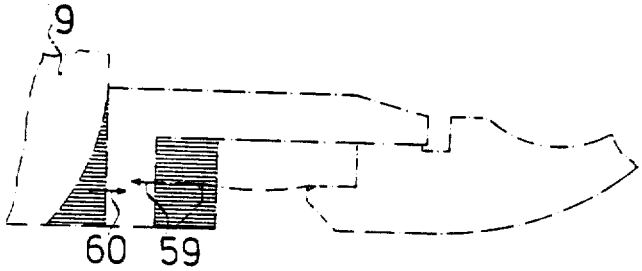
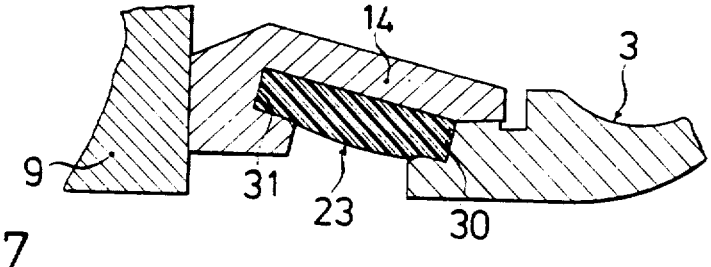
FIG. 7
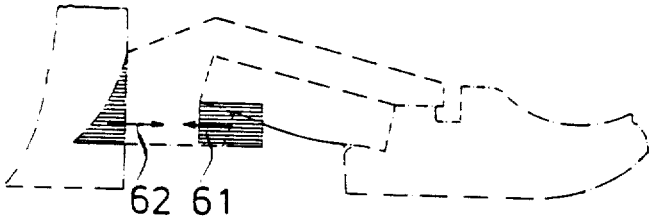

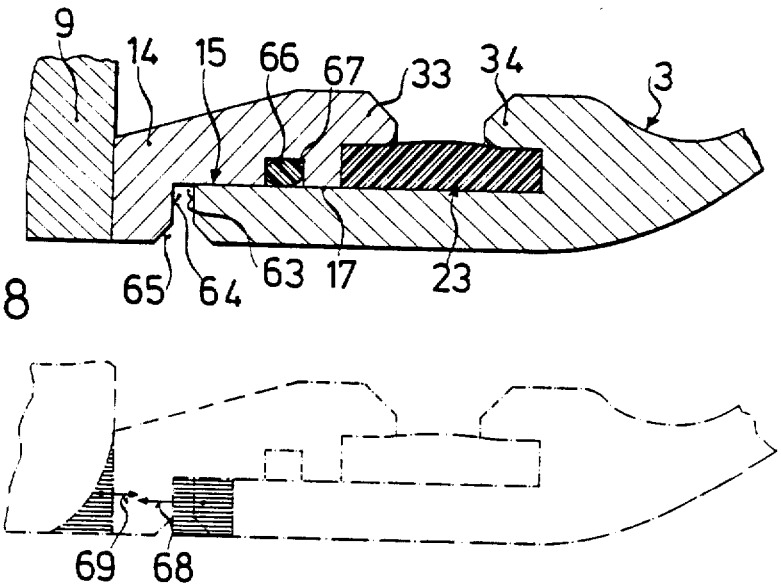
FIG.8
FIG. 9
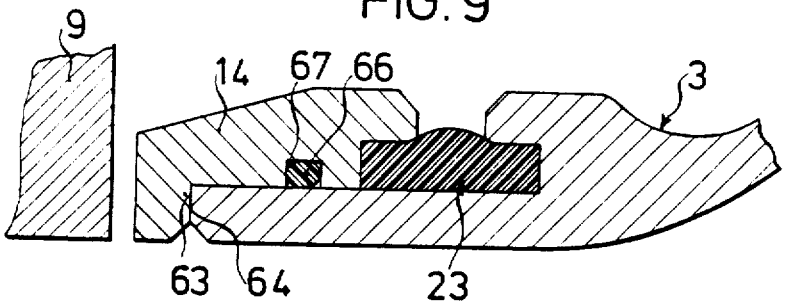

TWO-CYLINDER PUMP FOR HEAVY FLOWABLE MATERIALS, SUCH AS CONCRETE

Matter enclosed in heavy brackets [ ] appears in the original patent but forms no part of this reissue specification; matter printed in italics indicates the additions made by reissue.

BACKGROUND OF THE INVENTION

This invention relates to a two-cylinder pump for heavy flowable materials, such as concrete, the pump having a shutter mechanism which is pivotable across an apertured face plate, the shutter mechanism being sealed against the face plate by means of a cutting ring which is axially movable relatively to the shutter mechanism and is supported thereon with its rear side engaging a rectangular-section flexible rubber ring, whereby the cutting ring is urged resiliently aginst the face plate.

Such pumps must handle material which to a relatively large extent usually consists of hard particles of varying sizes, which in concrete comprise grains of sand and grit. In operation the shutter mechanism carries out periodic movements in rhythm with the piston strokes in the cylinders, so as to connect the output cylinder with a delivery conduit and the input cylinder with a storage container. The cutting ring provides a seal against the face plate, and also breaks up solid particles which are present in the material and which get in the way of parts moving in relation to each other when the shutter mechanism moves. Therefore the cutting ring must be urged against the face plate with considerable pressure. On the other hand, it must be able to move relatively to the face plate and the shutter mechanism to compensate for wear of itself and the face plate.

It is known that the cutting ring can be prestressed mechanically by the shutter mechanism (German Offenlegungsschrift No. 23 62 670). For this purpose the shutter mechanism, in the form of a swinging pipe, is resiliently connected by means of a swivel arm to a control shaft which is axially movable for prestressing the swivel arm. However, this has the disadvantage that flexible distortion of the mechanical parts produces a gap adjacent the face plate, and compensation for large amounts of wear of the face plate and the cutting ring is not possible.

It is further known that this mechanical prestressing can be replaced by hydraulic prestressing (German Offenlegungsschrift No. 28 35 590), which is variable in such a way that a greater contact pressure is produced when the shutter mechanism, in the form of a swinging pipe, is aligned with one of the cylinder openings. From beginning to end of the swinging motion, on the other hand, there is little contact pressure. This results in the formation of a gap, which is dangerous due to the hard particles in the material being transported. Moreover, prestressing by oil pressure is questionable on account of possible contamination of the concrete by the hydraulic liquid.

In a further improved solution (German Offenlegungsschrift No. 26 32 816), the cutting ring is prestressed without stressing the shutter mechanism, which is in the form of a swing pipe connected to the abovementioned swivel arm, in that the cutting ring is connected to a joint on the swivel arm. However, by this means large amounts of wear on the cutting ring and on the face plate cannot be compensated for in all directions, so that sooner or later it will no longer be possible to prevent the formation of a gap.

It is known from German Offenlegungsschrift No. 29 03 749 that, by means of the hydrostatic force of the material being transported, the shutter mechanism, which is in the form of an S-shaped swing pipe, can be pressed resiliently against the face plate hydrostatically and by the axial compression of a rectangular section sealing ring clamped on the delivery conduit. However, the mechanical compression of the flexible rubber ring only produces low axial forces, since the seatings allow the flexible rubber ring to deflect inwardly along the whole axial length of its inner surface. In this device the cutting ring is supported on a bearing in which spherical surface interact with each other in order to give the cutting ring freedom of movement, which allows compensation for wear on the face plate and cutting ring.

The arrangement of the sealing ring, the swing pipe and its S-shape all lead to difficulties in carrying out the desired operations.

The viscosity of the material being transported in this type of swing pipe causes a drop in pressure to a specific degree. Also, in operating the pump the pressure drop can suddenly increase considerably, for example if the shutter mechanism becomes clogged up. In this case, the cutting ring is only prestressed resiliently and therefore with much too low a force. The gimbal bearings of the cutting ring for their part present considerable difficulties.

This invention therefore proceeds from a previously known solution (German Offenlegungsschrift No. 26 14 895). This is based on the concept of, on the one hand, achieving the hydrostatic differential pressure, which presses the cutting ring with increased force on to the face plate, by means of a lesser stressing of the sealing surface of the cutting ring by the hydrostatic pressure of the flowable material in favour of a greater stressing of the rear side of the cutting ring with this pressure and, on the other hand, of prestressing the sealing ring necessary for sealing the cutting ring radially, which sealing ring can also be rectangular in cross-section, in such a way that the sealing ring can for its part easily resiliently prestress the cutting ring. However, when in operation, this radial prestressing is not convertable into any significant prestressing of the cutting ring on to the face plate. Since the pump must work not only in a compression operation but also in a suction operation, however, the sealing ring is often lifted from its seating during the suction operation of the pump and gets lost in the flowable material.

Moreover, there is also the disadvantage that the flexible rubber sealing ring and the cutting ring are only prestressed by the hydraulic pressure, since during the swinging movement of the shutter mechanism insufficient pressure of the cutting ring on to the face plate is achieved. Compensation for wear is only possible by retightening the swing pipe bearing by means of several tie rods. However, this can incur considerable risks to the pump, since even a slight deviation of the swivel axis from its predetermined position can lead to significant damage and destruction of the shutter mechanism. Large amounts of wear cannot be compensated for on the cutting ring, so that the formation of a gap is automatically caused by wear. Moreover, with metallic expanding devices which are used with a sealing ring consisting of an elastomer, it is not possible in practice to prevent this ring being lifted from its seating.

The object of the present invention is, with a pump of the latter-mentioned type, to achieve a reliable compression of the cutting ring on the face plate even during operation of the shutter mechanism, and automatic compensation for wear of the face plate and cutting ring, without any fear of losing the flexible rubber ring.

SUMMARY OF THE INVENTION

According to the invention there is provided a two-cylinder pump for heavy flowable materials, such as concrete, comprising a shutter mechanism, which is pivotable across an apertured face plate, the shutter mechanism being sealed against the face plate by means of a cutting ring which is axially movable relatively to the shutter mechanism and is supported thereon with its rear side engaging a rectangular-section flexible rubber ring, whereby the cutting ring is urged resiliently against the face plate, means for locating the cutting ring, along a portion of its length, on the shutter mechanism, a seating for the flexible ring on the cutting ring which includes an annular extension which partly overlaps the longer cross-sectional side of the flexible ring in the axial direction, a seating for the flexible ring on the shutter mechanism which includes an annular extension which partly overlaps the longer cross-sectional side of the flexible ring in the axial direction, said annular extensions partly overlapping the ring from opposite sides thereof so that a part of the surface of the ring is left free between the annular extensions, and stops on the cutting ring and the shutter mechanism which limit the extent to which the cutting ring is inserted in said means for locating the cutting ring on the shutter mechanism.

It is hereby achieved that a long-stroke spring can be embodied with the flexible rubber ring. As is well known, this ring forms a Poisson's body which does not change its volume on compression. Thus, on the one hand, according to this invention, the axial movement of the cutting ring limited by the stops is selected so that, on maximum insertion of the cutting ring into its locating means, the flexible rubber ring cannot be squeezed out and lifted from its seating and, for example, carried along by the material being transported. On the other hand, the free surface of the flexible rubber ring between the two annular extensions can be adjusted to the dimensions of the seatings in such a way that this ring cannot give way under pressure and the desired contact pressure can be achieved. By this means, the rear length of the cutting ring which is inserted into the locating means when in operation can be made so short that the cutting ring can be adjusted axially when wear takes place, and it can tilt during its pivotal movement if there is a large amount of wear, and can thus compensate for this.

With a long-stroke flexible rubber annular spring of this type, the free surface of the annular spring between the seatings can be deprived of the hydrostatic pressure of the material being transported, but the mechanical prestressing of the annular spring can nevertheless be used for pressing the cutting ring on to the face plate. They can be combined with hydrostatic compression of the cutting ring by means of hydrostatic forces on differential surfaces on the cutting ring.

In other cases, the flexible rubber ring and therefore also its seatings on the cutting ring are exposed to the hydrostatic pressure [fo] *of* the material being transported, and it is mechanically prestressed in such a way that the cutting ring is pressed [on to] *onto* the face plate. These embodiments can also be combined with a hydrostatic prestressing of the cutting ring by means of differential surfaces.

In general, one can proceed from the fact that, taken from the front face of the cutting ring on the face plate side, the pressure is not constant but is distributed depending on a function according to which the pressure decreases from the inside outwards. Since the opposite face of the cutting ring and, inasmuch as the seating of the flexible rubber ring is placed inside, also the seating of the cutting ring are completely loaded with the hydrostatic pressure, the hydrostatic compression of the cutting ring over differential surfaces can generally be achieved with a cylindrical inner surface of the cutting ring. However, the extent of this hydrostatic compression can be varied until there is a complete compensation of the differential forces existing on the ring surfaces of the cutting ring.

BRIEF DESCRIPTION OF THE DRAWINGS

FIG. 1, so as to represent the motion cycle of the shutter mechanism, shows a diagrammatic view of the openings of the delivery cylinders of a two-cylinder piston pump according to the invention, as a section along the line [B—B] *I—I* in FIG. 2, FIG. 2 is a section along the line [A—A] *II—IX to II—IX* in FIG. 1, FIG. 3, in the illustration corresponding to FIG. 2, shows this embodiment in simplified form, and below that shows a diagram of the static pressures which act directly on the cutting ring.

FIGS. 4 to 7 show modified embodiments of the invention in diagrams corresponding to FIG. 3, FIG. 8 shows a further modified embodiment, and FIG. 9 shows a particular operating condition of this embodiment, in a diagram corresponding to those of FIGS. 3 to 7.

DETAILED DESCRIPTION OF THE PREFERRED EMBODIMENTS

The inner edges of the openings on the pipework side of the two delivery cylinders of a two-cylinder pump for heavy materials are indicated at 1 and 2 in FIG. 1. A shutter mechanism 3 (FIG. 2) which is not shown in detail pivots through an arc 4 around a swivel axis 5. In its limiting positions, shown by the dotted lines 6 and 7, the pivoting mechanism 3 connects one delivery cylinder with the delivery conduit, which is not shown, whilst the other delivery cylinder is connected to an input container, from which it can draw in concrete. Therefore the pressure on the shutter mechanism briefly subsides during the feed motion, if the flowable material can give way in the input container.

According to FIG. 2, a housing 8 in which the openings from the delivery cylinders are formed is covered with a face plate 9: this has apertures 10 for each delivery cylinder which are aligned with the corresponding openings 11 in the housing 8. The face plate 9 is attached to the housing 8 by means of screws 12 with flush heads 13.

According to the embodiments shown, a cutting ring 14 provides the connection with the shutter mechanism 3. As a modification of the embodiments, the cutting ring 14 could be placed in an intermediate ring. It rests in a guide which is given the general reference numeral 15, which is formed at the cylinder end 16 of the shutter mechanism 3. The guide consists of a cylindrical surface 17 at the end 16 of the shutter mechanism 3 and a corresponding cylindrical surface 18 on the cutting ring 14.

In operation, the cutting ring 14 usually has a length a thereof inserted into the guide 15. Stop faces 19, 20 on the front face of the end 16 of the shutter mechanism 3 or on an outer annular flange 21 of the cutting ring 14 serve as stops, which limit the length of the cutting ring inserted into the guide 15.

The embodiment of the invention illustrated in FIGS. 1 and 2 is shown in FIG. 3, but with only the parts which are important to the operation being shown. In the limiting positions of the shutter mechanism 3, the cutting ring 14 surrounds an opening 1 or 2. If, during operation of the pump the swinging movement of the shutter mechanism is carried out, then the material being transported which is wedged between the cutting ring and the face plate must be cut through, shortly before the limiting positions are reached. In order to obtain full support of the cutting ring 14 during the cutting movements which occur between the cutting ring and the face plate, the ring is only directly supported along the short length given the reference a, and for the rest is supported on a flexible rubber annular spring 23. The initial cross-section of the annular spring is that of a rectangle. It is arranged in such a way that its shorter rectangular sides 24 and 25 extend radially, whilst the longer rectangular sides 26 and 27 extend axially. When the annular spring is assembled with the device it is axially prestressed by mechanical means. Thereby the annular spring shapes itself in a curve along its face lying between the seatings.

The seating of the annular spring 23 consists on the one hand of a cylindrical extension 29 of the guide surface 17, which accordingly extends axially, and also of radial surfaces 30 and 31, which in the embodiment shown are formed by rebates in the shutter mechanism 3 and cutting ring 14 respectively. Thereby, in all the embodiments shown, as can be seen in the example in FIG. 4, annular flanges 33, 34 are formed on the shutter mechanism 3 and on the cutting ring 14, which partially overlap faces 35, 36 of the flexible rubber annular spring 23. In the embodiment according to FIG. 3, the face 28 between the two annular flanges 33 and 34 remains free and is accordingly loaded with the hydrostatic pressure. During the delivery stroke of the pump, the cutting ring 14 is therefore pressed on to the face plate 9, both by the mechanical prestressing of the annular spring 23 and also by the annular spring which bears on the cutting ring being loaded with the hydrostatic pressure of the material being transported. The mean diameter Dz (FIG. 4) is determined by the guide 15. The radially inner limit of the contact surface of the cutting ring 14 on the face plate is indicated by the diameter Di, whilst the outer limit of this contact surface has the diameter Da. One can work on the following principle with sufficient accuracy: as long as the mean diameter is closer to the outer diameter of the contact surface, there is an excess of hydrostatic pressure in the direction of compression of the cutting ring on the face plate. If the mean diameter bisects this contact surface, there is a pressure equilibrium. If it is smaller, then there is a hydrostatic differential pressure which attempts to lift the cutting ring from the face plate. By this means one can allow the pressure produced by the prestressing of the annular spring to act alone, without hydrostatically supplementing it.

When sufficient clearance is allowed, as is indicated at 32 in FIG. 3, on the occurence of wear on the face plate or on the sealing surface 37 of the cutting ring 14 facing the face plate, the cutting ring can tilt, and therefore total surface contact is guaranteed both in the new situation and in the situation where there is wear.

The hydrostatic forces are shown in the lower diagram in FIG. 3. Here the cutting ring 14 has a cylindrical inner surface 38. Whilst the rear side of the cutting ring, which is given the general reference numeral 39 and which is loaded with the hydrostatic pressure up to the surface 29, is loaded radially and uniformly with the hydrostatic pressure, the hydrostatic pressure decreases from the inside outwards, as is shown by the curve 40 on the front face 41. The resulting forces are shown by arrows at 42 and 43; it can be seen that the hydrostatic forces which load the cutting ring 14 in the direction of the face plate 9 are greater than the forces 43.

In the embodiment according to FIG. 4, the force 45, acting upon the cutting ring 14 by lifting it up via a conical recess 44 on the front face 41 of the cutting ring 14, is about as great as the force 46. However, forces 47 and 49 also act upon the cutting ring 14, which are essentially balanced. Nevertheless, by prestressing the annular spring 23 a satisfactory sealing and a particularly small amount of wear is achieved with most materials.

According to FIG. 5, the prestressing forces of the cutting ring 14 lie somewhere between those in FIGS. 3 and 4. The forces 50 and 51 are balanced. Forces 52 and 53 are not of equal size. The force 52 presses the cutting ring 14 hydrostatically against the face plate. Simultaneously, the briefly guided cutting ring 14 is hydrostatically loaded by means of the deformed annular spring 23 and is mechanically prestressed. A support ring 54 improves the mechanical properties of the flexible rubber ring and permits a greater clearance, which is shown at 56. In this way, the load on the shutter mechanism 3 is transferred to the cutting ring without any metallic contact.

According to the diagram in FIG. 6, by means of the surfaces 17 and 18 the cutting ring guide is not in the axial position as in FIG. 2, but lies axially behind the annular spring 23, whereby the stop faces 19 are on the front face of the cutting ring 14, whilst the annular flange 21 lies on the outer side of the shutter mechanism 3. Therefore, in contrast to the embodiment according to FIGS. 1 to 3, the opposite surface 30 lies on the shutter mechanism 3.

The hydrostatic contact pressures 59 and 60 are unbalanced, so that the hydrostatic contact pressure 59 acting in the direction of the face plate 9 is greater than the pressure 60 acting alone.

In the embodiment according to FIG. 7, the axial seating 31 of the flexible rubber annular spring 23 in the cutting ring 14, which has the general formation shown in the embodiment according to FIG. 6, is displaced radially outwards, as opposed to its corresponding seating 30 in the shutter mechanism 3. The hydrostatic contact pressures 61, 62 are therefore equal. Therefore in this embodiment the cutting ring 14 is compressed mechanically by the annular spring 23 and not hydrostatically on to the face plate 9.

In the embodiment according to FIG. 8, the annular spring 23 is not subjected to the hydrostatic pressure of the flowable material, but in all operating conditions mechanically prestressed. The guide 15 of the shutter mechanism 3 and its annular extension 34 are therefore arranged on the outer side. The front face 63 of the shutter mechanism 3 and the annular surface 64, which is loaded with the hydrostatic pressure for prestressing the cutting ring on to the face plate 9, serve as stop faces for limiting the movement of the cutting ring, whereby the surface 65 is also loaded with the hydraulic pressure, as can be seen from the diagram in FIG. 8. In this case the flexible rubber annular spring 23 loses its sealing function, which in the embodiment according to FIG. 8 is carried out by an O-ring 66, which is formed in a corresponding groove 67 in the guide surface 17 of the cutting ring 14.

In the embodiment according to FIG. 8, the annular surfaces of the control mechanism 3 and of the cutting ring 14, which are loaded with the hydrostatic pressure, are formed in such a way that the axial forces on the ring 68 and 69 which are opposed to each other are unequal. The force 68 which is pressing down is greater than the uplifting force 69.

In the embodiment of FIG. 8 the stop faces 63 and 64 can abut one another, as shown in FIG. 9. This can occur, for example, during sudden withdrawal, that is, lifting of the cutting ring 14 from the face plate 9, perhaps if too hard particles have been cut through and the annular spring 23 has been compressed above its design limits. However, this situation only occurs very occasionally.

The flexible rubber ring 23 generally consists of a plastics material, if one disregards the [prop] *support* ring 54 which is provided if necessary. In particular, natural rubber with soft flexible properties can be considered, but also butadiene mixture polymerides, or perhaps a butadiene vinyl pyridine polymeride.

With annular springs of this type, the cutting ring can be hydrostatically pressed on to the face plate exclusively during the control phase and, if necessary, additionally after build-up of the hydrostatic pressure.

I claim:

1. A two-cylinder pump for heavy flowable materials, such as concrete, comprising a shutter mechanism which is pivotable across an apertured face plate, the shutter mechanism being sealed against the face plate by means of a cutting ring which has a contact surface on its front end for contacting the face plate and which is axially movable relatively to the shutter mechanism and is supported thereon with its rear end engaging [a rectangular cross-section flexible rubber ring, the flexible ring] *spring means* having first and second sides which are aligned generally axially and first and second ends which are aligned generally radially[,] *with* the first and second sides being of greater length than the first and second ends[, whereby] *for urging* the cutting ring [is urged] resiliently against the face plate, means for locating the cutting ring, along a portion of its length, on the shutter mechanism, one of the shutter mechanism and the cutting ring having a support surface for engaging the first side of the [flexible ring] *spring means* along essentially its entire length, a first seating for the first end of the [flexible ring] *spring means* on the cutting ring which includes an annular extension which partly overlaps the second side of the [flexible ring] *spring means* in the axial direction, a second seating for the second end of the [flexible ring] *spring means* on the shutter mechanism which includes an annular extension which partly overlaps the second side of the [flexible ring] *spring means* in the axial direction, said annular extensions partly overlapping the second side of the [flexible ring] *spring means* from opposite ends thereof so that a part of the second side surface of the [flexible ring] *spring means* is left free between the annular extensions, and stops on the cutting ring and the shutter mechanism which limit the extent to which the cutting ring is inserted in said means for locating the cutting ring of the shutter mechanism.

2. A pump according to claim 1, wherein the means for locating the cutting ring on the shutter mechanism and the annular extension on the shutter mechanism are arranged on the outer side of the shutter mechanism and the shutter mechanism and cutting ring are provided with annular faces which are subjected to hydrostatic pressure for urging the cutting ring on to the face plate and which also serve as stop faces.

3. A pump according to claim 1, wherein the means for locating the cutting ring on the shutter mechanism is arranged on an inner side of the shutter mechanism, the free part of the second side surface of the [flexible ring] *spring means* is subjected to the hydrostatic pressure of the flowable material, and the stops are provided by facing radial surfaces of the cutting ring and shutter mechanism respectively.

4. A pump according to claim 1, wherein the cutting ring has a cylindrical inner surface.

5. A pump according to claim 1, wherein the cutting ring has a conical inner surface, diverging towards the face plate, which is subjected to the hydrostatic pressure of the flowable material.

6. A pump according to claim 1, wherein the seating for the [flexible rubber ring] *spring means* on the cutting ring is disposed opposite and radially outwardly of the seating on the shutter mechanism.

7. A pump according to claim 1, wherein the means for locating the cutting ring on the shutter mechanism includes a cylindrical outer surface of the cutting ring and a cylindrical inner surface of the shutter mechanism which engages the outer cylindrical surface of the cutting ring.

8. A pump according to claim 7, wherein the shutter mechanism includes an annular flange which extends forward from the shutter mechanism toward the face plate, wherein the cylindrical inner surface of the support mechanism forms a portion of an inner surface of the annular flange, and wherein the support surface for engaging the first side of the [flexible ring] *spring means* along essentially its entire length forms a portion of the inner surface of the annular flange.

9. A pump according to claim 8, wherein the stop on the shutter mechanism is a radial surface at a forward end of the annular flange, and wherein the stop on the cutting ring is a radial stop surface which extends outward from the outer cylindrical surface of the cutting ring.

10. A pump according to claim 8, wherein the first seating for the first end of the flexible ring] *spring means* is defined by an outer surface of the annular extension of the cutting ring, a radial shoulder surface of the cutting ring which engages the first end surface of the [flexible ring] *spring means*, and the inner surface of the annular flange of the shutter mechanism[;], and wherein the second seating is defined by an outer surface of the annular extension of the shutter mechanism, the inner surface of the annular flange of the shutter mechanism, and a radial shoulder surface which engages the second end surface of the [flexible ring] *spring means*.

11. A two-cylinder pump for heavy flowable materials, such as concrete, comprising a shutter mechanism which is pivotable across an apertured face plate, the shutter mechanism being sealed against the face plate by means of a cutting ring which is axially movable relatively to the shutter mechanism and is supported thereon with its rear side engaging [a rectangular cross-section flexible rubber ring which has first and second sides and first and second ends, the side being of greater length than the ends whereby the cutting ring is urged] *spring means having first and second sides which are aligned generally axially and first and second ends which are aligned generally radially with the sides being of greater length than the ends for urging the cutting ring* resiliently against the face plate; a first cylindrical surface associated with the cutting ring and a second cylindrical surface associated with the shutter mechanism for locating the cutting ring, along a portion of its length, on the shutter mechanism; a support surface for engaging the first side of the [flexible ring] *spring means*; a first seating for the first end of the [flexible ring] *spring means* on the cutting ring which includes an annular extension which partly overlaps the second side of the [flexible ring] *spring means* in the axial direction, a second seating for the second end of the [flexible ring] *spring means* on the shutter mechanism which includes an annular extension which partly overlaps the second side of the [flexible ring] *spring means* in the axial direction, said annular extensions partly overlapping the second side of the [flexible ring] *spring means* from opposite ends thereof so that a part of the second side surface of the [flexible ring] *spring means* is left free between the annular extensions, and stops on the cutting ring and the shutter mechanism which limit the extent of axial movement of the cutting ring in a direction away from the face plate.

12. A pump according to claim 11, wherein the first cylindrical surface is a cylindrical outer surface of the cutting ring and the second cylindrical surface is a cylindrical inner surface which engages the outer cylindrical surface of the cutting ring.

13. A pump according to claim 12, wherein the shutter mechanism includes an annular flange which extends forward from the shutter mechanism toward the face plate, wherein the cylindrical inner surface forms a portion of an inner surface of the annular flange, and wherein the support surface for engaging the first side of the [flexible ring] *spring means* forms a portion of the inner surface of the annular flange.

14. A pump according to claim 13, wherein the stop on the shutter mechanism is a radial surface at a forward end of the annular flange, and wherein the stop on the cutting ring is a radial stop surface which extends outward from the outer cylindrical surface of the cutting ring.

15. A pump according to claim 13, wherein the first seating for the first end of the [flexible ring] *spring means* is defined by an outer surface of the annular extension of the cutting ring, a radial shoulder surface of the cutting ring which engages *a radial end surface of* the first end [surface] of the [flexible ring] *spring means*, and the inner surface of the annular flange of the shutter mechanism, and wherein the second seating is defined by an outer surface of the annular extension of the shutter mechanism, the inner surface of the annular flange of the shutter mechanism, and a radial shoulder [which] surface *which* engages *a radial end surface of* the second end [surface] of the [flexible ring] *spring means*.

16. A two-cylinder pump for heavy flowable materials, such as concrete, the pump comprising:

an apertured face plate;

a shutter mechanism which is pivotable across the apertured face plate, the shutter mechanism having a forward end spaced from and facing the face plate, a first annular flange which extends from the forward end axially toward the face plate, a second annular flange which extends [radially] *axially* from the forward end toward the face plate and which is generally parallel to the first annular flange, a generally radial shoulder surface between the first and second annular flanges, the first and second annular flanges and the radial shoulder surface defining an annular groove, a generally axial support surface associated with the first annular flange, and a generally radial stop surface;

a cutting ring having a contact surface at a front end for contacting the face plate, a generally radial shoulder surface and an annular flange at a rear end, and a generally radial stop surface for engaging the stop surface of the shutter mechanism to limit axial movement of the cutting ring with respect to the shutter mechanism in an axial direction away from the face plate;

[a long stroke spring in the form of a flexible ring having a rectangular cross-section] *spring means* with first and second sides which are aligned generally axially and first and second ends which are aligned generally radially[, the flexible ring being] positioned between the shutter mechanism and the cutting ring for urging the contact surface of the cutting ring resiliently against the face plate, the first side of the [flexible ring] *spring means* engaging the support surface of the shutter mechanism along essentially an entire length of the first side, the first end of the [flexible ring] *spring means* being positioned in a first seating defined by the support surface of the shutter mechanism and the shoulder surface and the annular flange of the cutting ring so that the annular flange of the cutting ring partly overlaps the second side of the [flexible ring] *spring means* in the axial direction, and the second end of the [flexible ring] *spring means* being positioned in a second seating formed by the annular groove in the shutter mechanism so that the second flange of the shutter mechanism partly overlaps the second side of the [flexible ring] *spring means* in the axial direction, the annular flange of the cutting ring and the second annular flange of the shutter mechanism being spaced from one another in the axial direction so that a part of the second side of the [flexible ring] *spring means* is left free between the annular flange of the cutting ring and the second annular flange of the shutter mechanism.

17. A pump according to claim 16, wherein the cutting ring has a cylindrical outer surface, and wherein the first annular flange of the shutter mechanism has a cylindrical inner surface which engages the outer cylindrical surface of the cutting ring.

18. A pump according to claim 17, wherein the support surface forms a part of the inner surface of the first annular flange.

19. A pump according to claim 16, wherein the stop *surface* on the shutter mechanism is a radial surface at a forward end of the first annular flange.

*20. The pump of claim 1 wherein the spring means is a rectangular cross-section flexible rubber ring.*

*21. The pump of claim 11 wherein the spring means is a rectangular cross-section flexible rubber ring.*

22. The pump of claim 16 wherein the spring means is a long stroke spring in the form of a flexible ring having a rectangular cross-section.

23. A two cylinder pump for heavy materials which has an apertured face plate, a shutter mechanism pivotable across the face plate, a cutting ring for sealing the shutter mechanism against the face plate with the cutting ring having a contact surface on its front end for contacting the face plate and being axially movable relative to the shutter mechanism, spring means for urging the contact surface of the cutting ring toward the face plate, first means for retaining one end of the spring means in operable engagement with the cutting ring, and second means for retaining an other end of the spring means in operable engagement with the shutter mechanism, characterized in that the spring means has first and second sides which are aligned generally axially and first and second ends which are aligned generally radially with the sides being longer than the ends, the spring means being positioned between the shutter mechanism and the cutting ring with the first side of the spring means engaging a generally axial support surface on the shutter mechanism along essentially an entire length of the first side and the first end of the spring means first being positioned in a first seating defined by the first retaining means which includes an annular extension which partly overlaps the second side of the spring means in the axial direction, and the second end of the spring means being positioned in a second seating defined by the second retaining means which includes an annular extension which partly overlaps the second side of the spring means in the axial direction so that a part of the second side of the spring means is left free between the annular extensions of the first and second retaining means.

24. The pump of claim 23 wherein the cutting ring has a cylindrical inner surface.

25. The pump of claim 23 wherein the shutter mechanism includes an annular flange which extends forward from the shutter mechanism toward the face plate, and wherein the inner surface of the annular flange forms the support surface for engaging the first side of the spring means.

26. The pump of claim 25 wherein the cutting ring has a cylindrical outer surface, and wherein the annular flange on the shutter mechanism includes a cylindrical inner surface which engages the cylindrical outer surface of the cutting ring.

27. The pump of claim 25 wherein the first retaining means is defined by an outer surface of the annular extension of the cutting ring, a radial shoulder surface of the cutting ring which engages a radial end surface of the first end of the spring means, and the inner surface of the annular flange of the shutter mechanism, and wherein the second retaining means is defined by an outer surface of the annular extension of the shutter mechanism, the inner surface of the annular flange of the shutter mechanism, and a radial shoulder surface of the shutter mechanism which engages a radial end surface of the second end of the spring means.

28. The pump of claim 23 wherein the shutter mechanism includes an annular flange which extends forward from the shutter mechanism toward the face plate, wherein the stop on the shutter mechanism is a radial surface at a forward end of the annular flange of the shutter mechanism, wherein the cutting ring has a cylindrical outer surface, and wherein the stop on the cutting ring is a radial stop surface which extends outward from the cylindrical outer surface of the cutting ring.

29. The pump of claim 23 wherein the spring means is a generally rectangular cross-section flexible ring.

30. The pump of claim 23 wherein the cutting ring and shutter mechanism have opposed stops aligned for engagement to limit the extent of axial movement of the cutting ring with respect to the shutter mechanism in a direction away from the face plate.

31. A two cylinder pump for heavy materials which has an apertured face plate, a shutter mechanism pivotable across the face plate which has an annular flange having an inner cylindrical surface thereon and a radial surface at a forward end of the annular flange, an annular cutting ring for sealing the shutter mechanism against the face plate with the cutting ring having a contact surface on its front end for contacting the face plate, an inner cylindrical surface of generally the same diameter as each aperture in the face plate, and being axially movable relative to the shutter mechanism, axially extending spring means for urging the contact surface of the cutting ring toward the face plate with the spring means having first and second sides which are generally axially aligned and first and second ends which are generally radially aligned, first means for retaining one end of the spring means in operable engagement with the cutting ring, and second means for retaining an other end of the spring means in operable engagement with the shutter mechanism, characterized in that the cutting ring has an annular extension on a rear end thereof which bears an outer cylindrical surface thereon that partly overlaps an inner annular side of the spring means in the axial direction, a radial shoulder surface which engages a radial end surface of one end of the spring means, an outer cylindrical surface which engages the inner cylindrical surface of the annular flange of the shutter mechanism, and a radial stop surface which extends outward from the outer cylindrical surface of the cutting ring for engagement with the radial surface on the annular flange of the shutter mechanism to limit the extent of axial movement of the cutting ring with respect to the shutter mechanism in a direction away from the face plate.

32. A two cylinder pump for heavy materials which has an apertured face plate, a shutter mechanism pivotable across the face plate which has an annular flange having a radial surface at a forward end thereof, a cutting ring for sealing the shutter mechanism against the face plate with the cutting ring being axially movable relative to the shutter mechanism, spring means for urging the cutting ring away from the shutter mechanism, first means for retaining one end of the spring means in operable engagement with the cutting ring, and second means for retaining an other end of the spring means in operable engagement with the shutter mechanism, characterized in that the cutting ring has a contact surface at a front end thereof for contacting the face place, a generally radial shoulder surface and an annular extension at a rear end thereof, and a generally radial stop surface for engagement with the radial surface of the annular flange of the shutter mechanism to limit axial movement of the cutting ring with respect to the shutter mechanism in an axial direction away from the face plate, and the spring means has first and second sides which are aligned generally axially and first and second ends which are aligned generally radially with the sides being longer than the ends, the spring means being positioned between the shutter mechanism and the cutting ring with the first side of the spring means engaging a generally axial support surface on the shutter mechanism along essentially an entire length of the first side and the first end of the spring means first being positioned in a first seating defined by the retaining means which includes the annular

*extension of the cutting ring which partly overlaps the second side of the spring means in the axial direction, and the second end of the spring means being positioned in a second seating defined by the second retaining means which includes an annular extension which partly overlaps the second side of the spring means in the axial direction so that a part of the second side of the spring means is left free between the annular extensions of the first and second retaining means.*

* * * * *

UNITED STATES PATENT AND TRADEMARK OFFICE

CERTIFICATE OF CORRECTION

PATENT NO. : Re. 32,657

DATED : April 26, 1988

INVENTOR(S) : Friedrich Schwing

It is certified that error appears in the above-identified patent and that said Letters Patent is hereby corrected as shown below:

Column 8, line 51, before "flexible", insert — [— (bracket).

Column 9, line 38, delete "toward" and insert --towards--.

Signed and Sealed this

Thirtieth Day of August, 1988

*Attest:*

DONALD J. QUIGG

*Attesting Officer*

*Commissioner of Patents and Trademarks*